Nov. 15, 1966 W. S. AUGUST ET AL 3,286,217
VACUUM TUBE MOUNTING STRUCTURE
Filed Jan. 22, 1962

INVENTORS
WILLIAM S. AUGUST
ELMER R. HASTINGS

*Fraser and Bogucki*
ATTORNEYS

United States Patent Office … 3,286,217
Patented Nov. 15, 1966

3,286,217
VACUUM TUBE MOUNTING STRUCTURE
William S. August, Altadena, and Elmer R. Hastings, Pomona, Calif., assignors to Inland Electronic Products Corporation, Pasadena, Calif., a corporation of California
Filed Jan. 22, 1962, Ser. No. 167,754
4 Claims. (Cl. 339—143)

This invention pertains to vacuum tube mounting structures and more particularly to vacuum tube mounting structures arranged to provide superior heat dissipation.

The rapid advances in technology have increased the uses of vacuum tubes substantially. Certain of the new uses of vacuum tubes place extreme requirements on their abilities. In many situations (such as ballistic missile control installations) it is essential that the tubes be shielded from external shock and field variations and have their operating temperatures maintained consistent in order to realize consistent operating characteristics.

A number of arrangements have been devised for protectively mounting vacuum tubes and dissipating their operational heat. For example, some mounting structures include tempered springs which are shaped to clamp about and conform to the envelopes of vacuum tubes of a specific size. Other mounting structures provide a cylindrically shaped clamp having means for securing it about vacuum tubes of a given size. Though such arrangements are entirely adequate in many situations, they present problems in others.

Vacuum tubes of a given type are produced with rather wide tolerance limits. For example, the circumference of the envelope of one miniature vacuum tube is specified to vary by more than one-tenth of an inch. Neither spring type mounting structures nor other mounts which have either fixed shapes or sizes can conform to the envelopes of tubes which vary by such a degree. Since heat dissipation is accomplished by contactive heat transfer between the tube envelope and mount surface in known arrangements, effective heat dissipation cannot be accomplished where envelope sizes and shapes vary. Furthermore, even though complete contact is obtained with a perfect tube, known mounting structures will not adapt to the individual envelope eccentricities of replacing tubes. Certain mounting structures have included clamps of malleable material to overcome this problem; but it has been found that once the clamps have been opened and closed or otherwise subjected to shock, they become brittle and refuse to conform to the shape of replacement tubes.

Even though complete mount-to-envelope conformity is obtained, an additional problem exists. Any mounting structure of tube envelope-conforming shape tends to reflect the heat generated by the operation of the vacuum tube back to the tube, thus undesirably increasing the operating temperature. Known structures have not resolved this problem.

Other problems arise because some mounting structures include pieces which may become detached within the equipment, allowing the tube to come loose and creating a possibility of short circuiting the equipment. Furthermore, the pressures exerted on tube envelopes by certain of the mounting structures make tube replacement extremely difficult.

It is therefore a general object of this invention to provide an improved vacuum tube mounting and heat dissipating structure.

Another object of the invention is to provide a strong, one-piece vacuum tube mounting structure of simple construction.

An additional object of the invention is to provide an efficient heat-dissipating mounting structure adapted to engage substantially the entire surface of initial and replacement tubes placed therein.

Another object of this invention is to eliminate work-hardening of mounting structures comprising malleable materials.

A further object of this invention is to provide a vacuum tube heat-dissipating mounting structure adapted to fit a plurality of like vacuum tube envelope configurations having envelope eccentricities.

Yet another object of this invention is to reduce the reflective properties of envelope-conforming mounting structures.

Briefly, in accordance with the invention an exemplary one-piece, tube mounting structure is provided comprising a cylindrical member of malleable metallic material of a diameter generally conforming to that of the outer envelope of a vacuum tube. The cylindrical member has an opening extending parallel to its axis along one side and provides a pair of margins adjacent the opening. A clamping arrangement including a generally triangular-shaped wire member is secured to both margins of the cylindrical member in a slidable arrangement whereby longitudinal movement of the wire member in one direction causes the cylindrical member to close evenly and tightly about any tube positioned within the bore thereof. The closure of the cylindrical member about its axis by inward pressure at the margins forces the malleable metallic material to conform to the entire outer tube envelope in thermally conductive relationship therewith. The wire member advantageously varies the diameter of the cylindrical member sufficiently to allow tubes to slide freely into the open cylinder and still clamp tightly about envelopes of varying diameters. As tubes are replaced from time to time, the inward pressure developed in this manner causes the malleable material to conform to the envelope of each tube as it is mounted, thus holding the tube in position and maintaining close contact with the tube envelope to aid in transferring heat therefrom. The arrangement outlined is adapted to be mounted to structural circuit members to position the vacuum tube and to dissipate the heat generated by its operation.

In accordance with one aspect of the invention, a heat-treatment process is applied to the malleable material to render it substantially invulnerable to work-hardening by heat, vibration or shaping. In accordance with another aspect of the invention, the inside of the cylinder is roughened and blackened by a treatment which includes pressing an emery material against the inner surface and coating with a non-reflective material whereby the heat-reflective properties of the shield are cut to a minimum.

A better understanding of the invention may be had from a consideration of the following detailed description taken together with the drawings, in which like elements in the various figures have like designations and in which.

Figure 2:
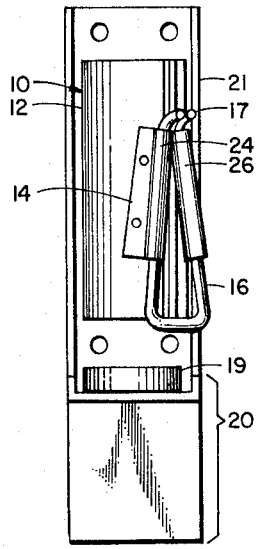
FIG. 2 is a front elevational view of the arrangement of FIG. 1.
Figure 1:
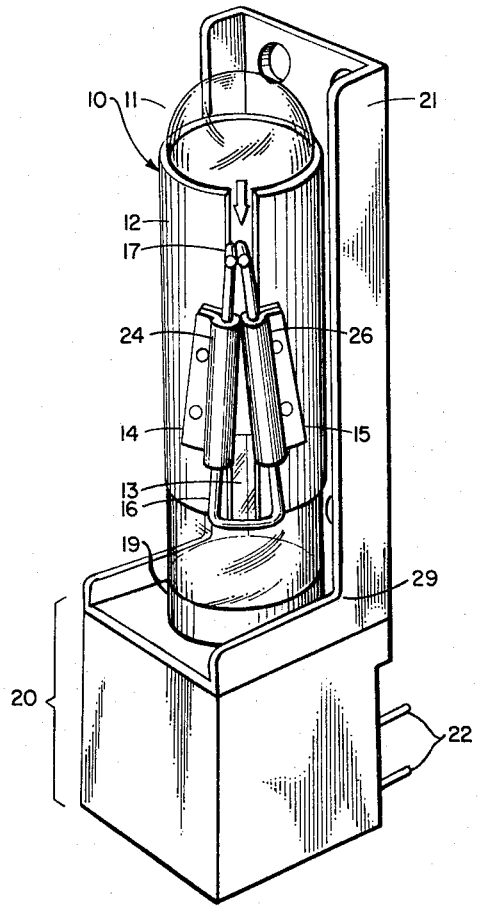
FIG. 1 is a perspective view of one particular arrangement in accordance with the invention showing a vacuum tube mount and heat-dissipating arrangement having a vacuum tube positioned therein.
Figure 4:
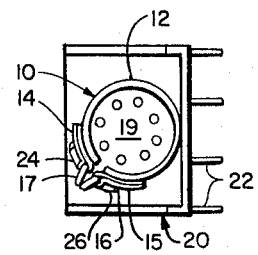
FIG. 4 is a plan view of the arrangement of FIG. 1.

Referring more particularly to FIG. 1, there is shown a mounting structure 10 in accordance with the invention having a vacuum tube with an exterior envelope 11 positioned therein. The mounting structure 10 includes a cylindrical clamp 12 of a malleable material which may be heat treated to protect against its becoming brittle during use. For example, the material of clamp 12 may be an extremely fine-grained silver (approximately 99.5% pure) which is heated at a temperature slightly less than 600° F. for a substantial period to accomplish softening while maintaining the fine grain. As shown in FIGS. 1 and 4, the clamp 12 is of a generally cylindrical shape so as to fit about the envelope 11 of a vacuum tube.

The clamp 12 has an opening 13 extending parallel to its axis along one side of a width sufficient to allow appreciable change in the diameter of clamp 12. First and second metallic guides 14 and 15 may advantageously be secured alongside the opening 13, as by spot-welding to the outer surface of the clamp 12. The guides 14 and 15 may each have a smaller rolled portion 24, 26, respectively, arranged to present a slight angle relative to the margins of the opening 13 of the cylindrical clamp 12 and to diverge relative to each other. The guides 14 and 15 may be manufactured by bending a thin metallic member, such as beryllium copper sheeting, upon itself to form the rolled portions 24 and 26. A wire member 16 has straight side portions slidably positioned in the rolled portions 24 and 26 of the guides 14 and 15. As will be noted, the wire member 16 is generally triangular in form with the apex portion being bent outwardly to provide a convenient projection 17 for opening and closing the clamp 12. The shape of the wire member 16 is such that pressure on the projection 17 in the direction indicated by the hollow arrow in FIG. 1 causes the straight side portions of the member 16 to exert pressure upon the inner surfaces of the guides 14 and 15, evenly along the length thereof, in a direction tending to narrow the opening 13 in the clamp 12. Motion of the member 16 in the direction indicated draws the clamp 12 about the envelope 11 of the tube. Since the material of the clamp 12 is malleable, the clamp 12 is forced to conform to the diameter of varying tube envelopes and to any small eccentricities in the outer surfaces thereof, thus providing improved thermal coupling therewith.

When a tube is to be removed, pressure exerted upwardly (opposite the arrow direction) on the projection 17 releases the tube so that it slides freely within the clamp 12. When a new tube is inserted, movement of the member 16 in the arrow direction forces the clamp 12 to conform to the diameter and different eccentricities of the replacing tube. In this manner, the tube may be tightly clamped in position as long as desired and suitable heat transfer is effected at all points about the outer surface of the tube. Of particular note is the fact that the envelope 10 is not unduly stressed in placing it in position, as is so often the case with known mounts. The only pressure applied is that necessary to hold the tube in place. It should also be noted that the projection 17 is positioned so that when a tube is inserted and clamped the member 16 is in a position adapted to reduce the size of the installation. Furthermore, the clamp 12 and the member 16 are arranged as a one-piece unit so there is no chance of pieces falling into the equipment. If desired, locking means such as a detent may be provided for affixing the member 16 in predetermined positions. This, however, has been found unnecessary in practice. The clamp 12 may advantageously be secured in thermal-conducting relationship with a mounting piece 21 by well-known means such as spot-welding. In a preferred embodiment the piece 21 is formed from sheet material by a pressure molding technique which forms especially strong corners at 29 so that the entire mount is rendered substantially shock resistant. In the embodiment of the invention shown in FIGS. 1–4, the clamp 12 is spot-welded in a position such that the clamp 12 is appropriately arranged above an assembly 20 and undesired lateral or axial movements are prevented. The piece 21 may be constructed of a number of known heat-conductive materials and may be secured to a structural heat sink, if desired.

Figure 3:
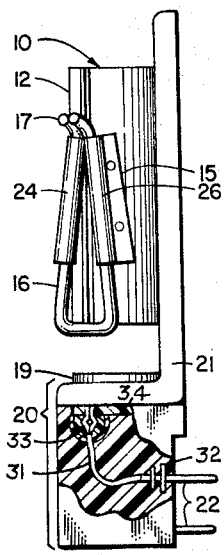
FIG. 3 is a side elevational view of the arrangement of FIG. 1 partially cut away to illustrate certain aspects of the arrangement.

As shown in FIG. 3, the assembly 20 includes an appropriately positioned tube socket 19 of known construction arranged to project through a hole in the piece 21. The individual pin sockets 33 of the tube socket 19 are connected by conductors 31 to a number of connector pins 22 arranged to provide suitable circuit connections for the tube. The assembly 20 also includes a base piece 32 of a material such as an epoxy resin which may be molded to harden into a protective covering about the socket 19, the conductors 31 and the inner extensions of the pins 22. The piece 32 affixes the individual members of the structure together and protects the assembly 20 from vibration and shocks. If desired, a resilient plastic or other material 34, as shown in FIG. 3, can be placed immediately about the pin sockets 33 to allow sufficient movement therein for seating a tube and to preclude the epoxy resin from seeping into the socket 19 during molding. The entire arrangement is thus a modular unit including the tube, the clamp and the base assembly which may be inserted in predetermined circuit configurations by "plug-in" methods.

According to one aspect of the invention, the inner surface of the clamp 12 may be treated to diminish its reflective characteristics. This may be accomplished by abrading one surface of the plate from which the clamp 12 is formed with a suitable material, such as emery paper and blackening that surface, such as by coating with polysulfide material. The interior of the clamp 12 is treated in this manner to provide a more effective heat-transferring member in which the reflection of heat back to the tube is reduced. It should be understood that where known arrangements provide contactive thermal conduction to reduce envelope temperature, the present invention provides in addition for absorption of interior tube heat of infrared frequencies, matrially aiding heat dissipation. It will be noted that heat dissipation may be further aided by plating the exterior of the clamp 12 with a highly reflective substance such as chromium, aluminum or the like to increase the transfer to the atmosphere.

As will be appreciated from the drawings, the construction of the mounting structure of the invention is extremely simple, encompassing in essence only a single clamp 12 with closure means affixed thereto. Even so, the arrangement provides improved clamping and heat-dissipation. Moreover, since no initial spring pressure need be overcome in positioning a tube, the arrangement eliminates all undesired stresses upon the tube envelope. Furthermore, when the simplified construction is contrasted with the more complicated forms heretofore employed to provide both axial and lateral positioning, the economic advantages of the simpler construction presented by the arrangements in accordance with the invention are apparent.

Although there has been described above a specific arrangement of a heat dissipating vacuum tube mounting structure for the purpose of illustrating the manner in which the invention may be used to advantage, it will be appreciated that the invention is not limited thereto. Accordingly, any and all modifications, variations or equivalent arangements falling within the scope of the annexed claims should be considered to be a part of the invention.

What is claimed is:

1. A vacuum tube clamp comprising a hollow generally cylindrical member formed of malleable metallic material having an opening extending axially along the length thereof; and means for varying the circumference of said cylindrical member comprising first and second guiding means secured to the exterior of said cylinder and at an angle relative to each other, and pressure means slidably connected to the first and second guiding means for varying the distance therebetween, said pressure means comprising first and second slidable surfaces arranged to contact said first and second guiding means, respectively, said surfaces being disposed at an angle relative to each other.

2. A vacuum tube mounting arrangement comprising a substantially-cylindrical hollow clamping portion of malleable metal having an opening extending axially along the length thereof; and means for controlling the extent of said opening including a spring wire member of substantially triangular shape, and first and second rolled guiding means enclosing portions of two sides of said triangular wire in a slidable arrangement, said guiding means being, respectively, secured to the exterior surface of said cylindrical clamping portion on opposite sides of said opening, and disposed at an angle relative to each other, whereby uniform pressure is exertable on said clamping portion throughout the length thereof.

3. A heat-dissipating mounting structure for a vacuum tube comprising a clamp of malleable material readily conformable to the shape of an outer envelope of a vacuum tube to be positioned therein for improved thermal conductivity, said clamp having an opening extending along one side thereof; means for extending or narrowing said opening so as to urge said clamp into uniformly conforming relation to said envelope, said means comprising a triangular spring wire member, a first guiding means affixed to said clamp at an acute angle to said opening for containing one side of said wire member, and a second guiding means affixed to said clamp at the remote side of said opening for containing another side of said wire member in slidable relation therewith; means adapted to mount said clamp in thermal-conducting relationship to a vacuum tube; a tube socket positioned relative to said clamp for mounting a vacuum tube in said clamp; and means for positioning said clamp and tube socket relative to each other.

4. A vacuum tube mount comprising a generally cylindrical malleable thermally-conductive metallic member readily conformable to a vacuum tube envelope and having an axial opening along the length thereof; means for varying the width of the opening and maintaining selected widths thereof; said means comprising first and second guiding means secured to said metallic member on opposite sides of said member and at an angle relative to each other, and spring wire means slidably engaging said guiding means and adapted to uniformly bias opposite edges of said member toward and away from each other along the length thereof; a thermally-conductive support affixed directly to said member, said support being of a general "L" shape having strengthened corners; a tube socket projecting through a hole in said support in a manner to provide for positioning a vacuum tube within said member; an epoxy resin base molded to join said support and said tube socket; means for providing connections through said base to said tube socket; and a resilient material immediately surrounding connections of said tube socket.

References Cited by the Examiner
UNITED STATES PATENTS

| | | | |
|---|---|---|---|
| 2,596,528 | 5/1952 | Carlson | 339—223 |
| 2,701,866 | 2/1955 | Chapman | 339—75 |
| 2,704,838 | 3/1955 | Macha et al. | 339—259 |
| 2,840,629 | 6/1958 | Roth et al. | 174—35 |
| 2,852,594 | 9/1958 | Amand | 165—185 X |
| 2,888,228 | 5/1959 | Jarvis | 174—35 |
| 2,997,527 | 8/1961 | Kessel et al. | 174—110 X |
| 3,020,451 | 2/1962 | McAdam | 339—75 X |

OTHER REFERENCES

Addicks, L.: "Silver in Industry" (1940), pp. 175, 188, 307, 396.

Wyner, R. H.: "Electronic Design," Feb. 15, 1961, p. 219.

EDWARD C. ALLEN, *Primary Examiner.*

JOSEPH D. SEERS, *Examiner.*

A. S. TRASK, *Assistant Examiner.*